United States Patent [19]

Becker

[11] Patent Number: 5,249,459

[45] Date of Patent: Oct. 5, 1993

[54] DIAGNOSTIC PROCESS FOR CHECKING ACTUATORS FOR THE CONTROL OF INTERNAL COMBUSTION ENGINES

[75] Inventor: Rüdiger Becker, Murr, Fed. Rep. of Germany

[73] Assignee: Robert Bosch GmbH, Stuttgart, Fed. Rep. of Germany

[21] Appl. No.: 768,413

[22] PCT Filed: Dec. 13, 1990

[86] PCT No.: PCT/DE90/00960

§ 371 Date: Oct. 7, 1991

§ 102(e) Date: Oct. 7, 1991

[87] PCT Pub. No.: WO91/13246

PCT Pub. Date: Sep. 5, 1991

[30] Foreign Application Priority Data

Feb. 26, 1990 [DE] Fed. Rep. of Germany ....... 4005973

[51] Int. Cl.[5] ........................................... G01M 15/00
[52] U.S. Cl. .................................................. 73/118.1
[58] Field of Search ............... 73/118.1, 116; 123/442, 123/90.15

[56] References Cited

U.S. PATENT DOCUMENTS

| | | | |
|---|---|---|---|
| 4,601,199 | 7/1986 | Denz | 73/118 |
| 4,719,886 | 1/1988 | Kotani et al. | 123/442 X |
| 4,856,465 | 8/1989 | Denz et al. | 123/90.17 |
| 4,996,954 | 3/1991 | Seki et al. | 123/90.15 X |
| 5,033,290 | 7/1991 | Seki et al. | 73/118.1 |

FOREIGN PATENT DOCUMENTS 60-069238  4/1985  Japan.

Primary Examiner—Jerry W. Myracle
Attorney, Agent, or Firm—Baker & Daniels

[57] ABSTRACT

A diagnostic procedure is proposed for the checking of actuators for the control of internal combustion engines, in particular for the diagnosis of the function and effect of variations of the suction pipe or suction tract geometry and/or variations of the inlet/outlet valve control; this procedure serves the purpose of actuating the diagnosis during any operational state and/or during stationary operational states of the internal combustion engine. For diagnosis, those changes taking place during actuator triggering in operational data of the internal combustion engine which are only indirectly due to this actuator triggering are recorded as actual values and these actual values are compared with set values.

19 Claims, 1 Drawing Sheet

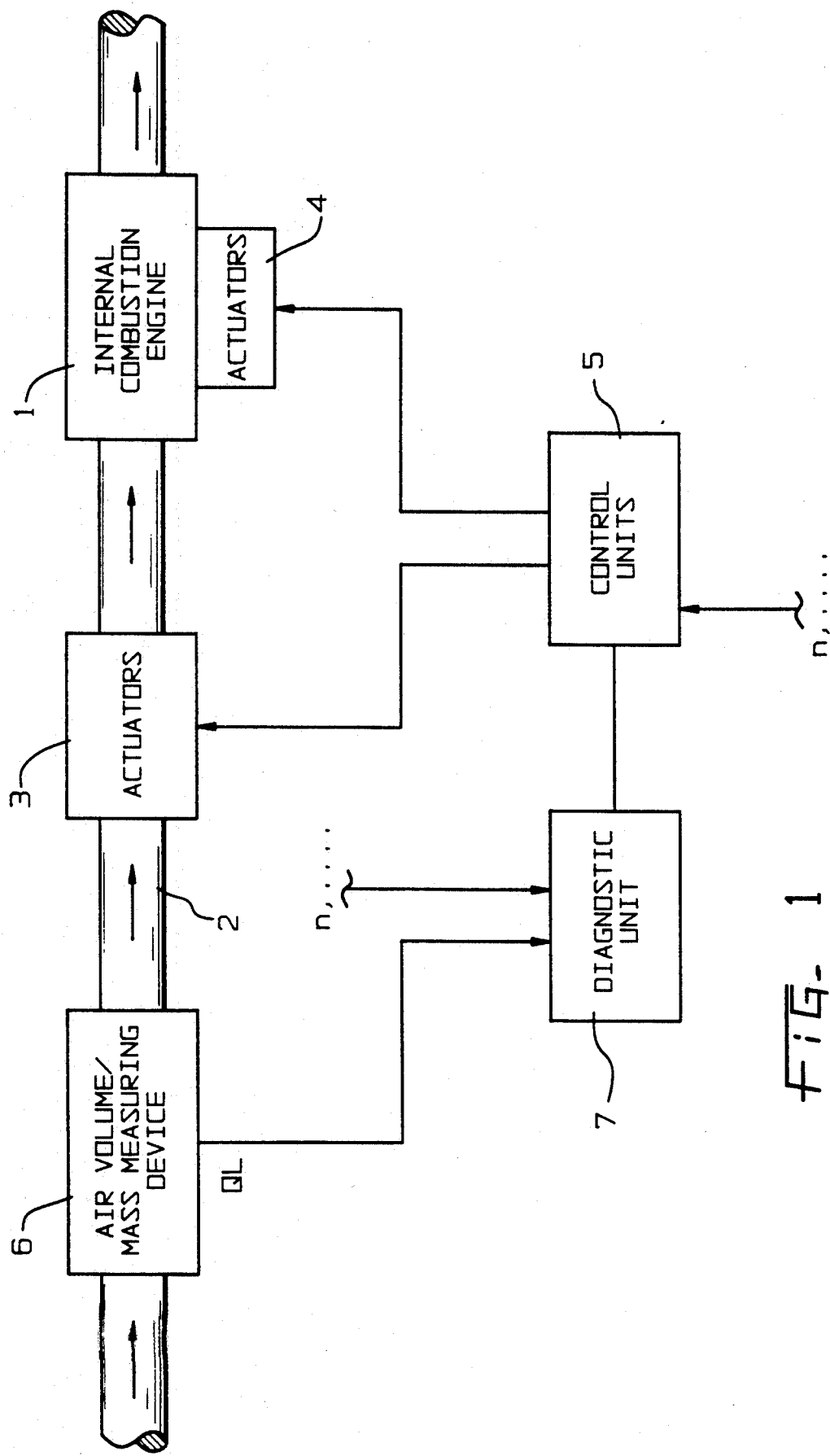

DIAGNOSTIC PROCESS FOR CHECKING ACTUATORS FOR THE CONTROL OF INTERNAL COMBUSTION ENGINES

BACKGROUND OF THE INVENTION

The invention is based on a process for diagnosing the functional elements of an internal combustion engine.

It is well known that when running internal combustion engines, the performance of the engine is influenced by varying the inlet/outlet valve control and/or varying the suction pipe or suction tract geometry. In this situation the control of the inlet/outlet valve is by one of two actuator options e.g. by means of the camshaft action, or, the control of the inlet-/outlet valve is continuous, as for example in electrochemical or electrohydraulic actuating devices of the inlet/outlet valve control. Prime examples to be mentioned here are DE 32 47 916 (device for controlling the valves of an internal combustion engine via a camshaft) and DE-PS 21 01 761. By varying the suction pipe or suction tract geometry, the tuned intake pressure charging of the combustion chambers is optimised in the current operational state of the engine, through which an increased air supply to the combustion chambers is made possible, while the position of the other actuators, in particular of the throttle valve, is otherwise unchanged. DE 36 08 310 A1 and DE 39 08 475 A1 can be cited as examples. In this case too the variations take place either discontinuously, e.g. by operating tuning valves in the suction pipe or suction tract, or the variations occur continuously through the operation of several actuator options of one or several actuators.

Furthermore, from European Patent Application EP-A 170 018 a process is known for the self-diagnosis of an actuator of an idling filling control for internal combustion engines. There, an arbitrary actuator triggering is used for the diagnosis of the actuator, i.e. instead of the triggering of the actuators to be diagnosed, which optimises the other working sequences, one or several defined actuator triggerings take place and their effects on other operational data of the internal combustion engine are analyzed. Diagnosis can thus take place only during certain operational states, in particular stationary conditions, since otherwise the engine's method of operation, in accordance with the program, i.e. optimised by further actuators, would be disturbed in its running.

SUMMARY OF THE INVENTION

In contrast, the diagnostic process in accordance with this invention enables a diagnosis of the actuators for variation of inlet-/outlet valve control and/or for variation of the suction pipe or suction tract geometry in actuator controls, which take place within the scope of the program-dependent control of the internal combustion engine, i.e. such controls as optimise the working sequence, without requiring additional hardware expenditure, e.g. in the form of position response feedback. For the diagnostic procedure presented here, depending on design and integration of the systems involved, the data already available in the normal operation of the internal combustion engine can be applied. The particular advantage of this arrangement is that the area accessible to a diagnosis is not restricted to just the control device of the actuating system and the actuator itself. Rather, the diagnosed area is expanded through the procedure in accordance with this invention, to all elements of the chain of effects with the variable suction pipe or suction tract geometry and/or with the inlet/outlet valve control.

BRIEF DESCRIPTION OF DRAWINGS

A design example of the invention is shown in the drawing, and explained in more detail in the description below.

DETAILED DESCRIPTION OF THE INVENTION

In this design example, the aim is to show the diagnostic procedure for checking actuators for the control of an internal combustion engine, on the basis of a block diagram. Here, the actuators to be diagnosed are those for varying the suction pipe or suction tract geometry and/or for varying the inlet/outlet valve control.

Position 1 in the design example describes an internal combustion engine to which the air necessary for combustion is supplied via a suction pipe 2 or a suction tract. Position 3 summarises actuators for varying the suction pipe or suction tract geometry, and position 4 summarises actuators for varying the inlet/outlet valve control. Triggering of the actuators to be diagnosed takes place via control units, which for the sake of clarity are summarised in position 5. The control signals of the actuators to be diagnosed, and further operational data such as e.g. the air volume or air mass QL measured by an air volume or air mass measuring device 6, are fed to a diagnostic unit 7.

Triggering of the variations of the suction pipe or suction tract geometry 3 as well as of the variations of the inlet/outlet valve control 4 causes a change in the operating point of the internal combustion engine 1. This causes a change in one or several operational data, which is only indirectly due to this actuator triggering of the actuators 3 and 4. Thus for example the air volume or air mass QL drawn through the suction pipe or the suction tract 2, as measured by the air volume or air mass measuring device 6, changes. Depending on the operating parameters of the internal combustion engine 1, particularly the revolutions, n, and/or the load L, the control device 5 controls the actuators for varying the suction pipe or the suction tract geometry 3, and/or the actuators for variations of the inlet/outlet valve control 4. Two possibilities of diagnosis can now be applied:

In one case, the trigger signals of the actuators to be diagnosed, which takes place within the scope of the program-dependent triggerings, i.e. those which optimise the operating sequence of the internal combustion engine, are fed to the diagnostic unit 7.

In the other case, in certain operational states, e.g. stationary operational states, defined triggerings of the actuators to be diagnosed are actuated arbitrarily and fed to the diagnostic unit 7. By arbitrary, it is meant that instead of the triggerings which optimise the operating sequences of the internal combustion engine, defined actuator triggerings take place.

Depending on these trigger signals, operational data of the internal combustion engine which are only indirectly due to this actuator triggering, e.g. the air volume or air mass QL measured by the air volume or air mass measuring device 6, are stored as actual values in the diagnostic unit 7 and compared with stored set values. In this process, either individual actuator variations are compared with corresponding set values, or the overall actuator variations are compared with stored function sequences.

What is claimed is:

1. A process for the diagnosis of actuators of an internal combustion engine, said process for diagnosing occurring while the operating sequences of the internal combustion engine are being regulated, said process comprising the steps of:

triggering said actuators for the control or regulation of the internal combustion engine during normal operation of the internal combustion engine, said triggering varying at least one of a suction pipe geometry and an inlet/outlet valve of the internal combustion engine;

recording changes in operational data values of the internal combustion engine during said triggering, said operational data relating to at least one of revolutions per minute, intake air volume flow rate and intake air mass flow rate of the internal combustion engine;

comparing the recorded values with stored set values; and diagnosing said actuators with the results of the comparison.

2. A process in accordance with claim 1, characterised by the fact that the variations of the inlet/outlet valve are brought about by camshaft actions.

3. A process in accordance with claim 2, characterized by the fact that the variations of the inlet/outlet valve control are brought about by electromechanical or electrohydraulic control devices.

4. A process in accordance with claim 2, characterized by the fact that said actuators comprise tuning valves in said suction pipe.

5. A process in accordance with claim 2, characterised by the fact that defined actuator triggerings take place.

6. A process for the diagnosis of actuators of an internal combustion engine, said process for diagnosing occurring while the operating sequences of the internal combustion engine are being regulated, said process comprising the steps of:

arbitrarily triggering at least one of said actuators for the control or regulation of the internal combustion engine during stationary operational states of the internal combustion engine said triggering varying at least one of a suction pipe geometry and an inlet/outlet valve of the internal combustion engine, said variation of said inlet/outlet valve brought about by camshaft actions;

recording changes in operational data values of the internal combustion engine during said triggering, said operational data values relating to at least one of revolutions per minute, intake air volume flow rate and intake air mass flow rate of the internal combustion engine;

comparing the recorded values with stored set values;

storing the influences of the remaining actuators sequentially during diagnosis; and diagnosing said actuators with the results of the comparison.

7. A process in accordance with claim 6, comprising the further steps of scanning the functional sequence of the total possible actuator variation during said arbitrary actuator triggering, and recording and comparing the corresponding changes in the respective actual values with the stored functional sequences.

8. A process in accordance with claim 2, characterized by the fact that the actuators are diagnosed as functional elements.

9. A process in accordance with claim 2, characterized by the fact that elements of the internal combustion engine which are actively connected to the actuators are diagnosed with regard to malfunction.

10. A process in accordance with claim 2, characterized by the fact that the variations of the suction pipe geometry take place continuously through the triggering of at least one actuator.

11. A process in accordance with claim 1, characterised by the fact that the variations of the inlet/outlet valve control are brought about by electromechanical or electrohydraulic control devices.

12. A process in accordance with claim 11, characterized by the fact that the variations of the suction pipe or suction tract geometry take place discontinuously through the operation of tuning valves in the suction pipe or suction tract as actuators.

13. A process in accordance with claim 11, characterised by the fact that defined actuator triggerings take place.

14. A process in accordance with claim 1, characterised by the fact that said actuators comprise tuning valves in said suction pipe.

15. A process in accordance with claim 1, characterised by the fact that defined actuator triggerings take place.

16. A process in accordance with claim 1, characterized by the fact that the actuators are diagnosed as functional elements.

17. A process in accordance with claim 1, characterised by the fact that elements of the internal combustion engine which are actively connected to the actuators are diagnosed with regard to malfunction.

18. A process for the diagnosis of actuators of an internal combustion engine, said process for diagnosing occurring while the operating sequences of the internal combustion engine are being regulated, said process comprising the steps of:

arbitrarily triggering at least one of said actuators for the control or regulation of the internal combustion engine during stationary operational states of the internal combustion engine, said triggering varying at least one of a suction pipe geometry and an inlet/outlet valve of the internal combustion engine;

recording changes in operational data values of the internal combustion engine during said triggering, said operational data values relating to at least one of revolutions per minute, intake air volume flow rate and intake air mass flow rate of the internal combustion engine;

storing the influences of the remaining actuators sequentially during diagnosis;

comparing the recorded values with stored set values; and diagnosing said actuators with the results of the comparison.

19. A process in accordance with claim 18, comprising the further steps of scanning the functional sequence of the total possible actuator variation during said arbitrary actuator triggering, and recording and comparing the corresponding changes in the respective actual values with the stored functional sequences.

* * * * *